United States Patent [19]
Enders

[11] 3,789,712
[45] Feb. 5, 1974

[54] APPARATUS FOR SEVERING TIRE PLY STOCK AND THE LIKE
[75] Inventor: George E. Enders, Salem, Ohio
[73] Assignee: NRM Corporation, Cleveland, Ohio
[22] Filed: Oct. 16, 1972
[21] Appl. No.: 298,021

[52] U.S. Cl............... 83/171, 83/431, 83/486.1, 83/614
[51] Int. Cl............................................. B26d 7/10
[58] Field of Search..... 83/171, 614, 523, 563, 574, 83/581, 613, 431, 486.1

[56]  References Cited
UNITED STATES PATENTS
2,665,757  1/1954  Stevens et al.............. 83/555 X
3,641,855  2/1972  Balle......................... 83/171
3,732,767  5/1973  Habert....................... 83/171

Primary Examiner—Donald R. Schran
Attorney, Agent, or Firm—Donnelly, Maky, Renner & Otto

[57] ABSTRACT

Apparatus for use as with a tire building machine servicer having a conveyor on which tire building materials such as corded ply stock and cordless gum ply or liner stock are intermittently advanced lengthwise for cutting to predetermined length at desired bias angle, said apparatus being characterized in that it has lifting means for lifting a portion of the stock from the conveyor on either side of the line of the desired cut up against a stock support, and a knife blade guided by the apparatus for movement above the conveyor and across the width of the lifted portion of the stock at the desired bias angle, said knife blade having an inclined cutting edge to provide an upward force component to retain the stock against the support during the cutting operation and being heated to facilitate the cutting operation of the uncured rubber-like material of cordless gum liner stock or of the uncured rubber-like material between adjacent cords of corded ply stock. In the case of cutting of corded ply stock, the knife blade is additionally vibrated to facilitate the finding of the desired cut line between adjacent cords thereof.

8 Claims, 5 Drawing Figures

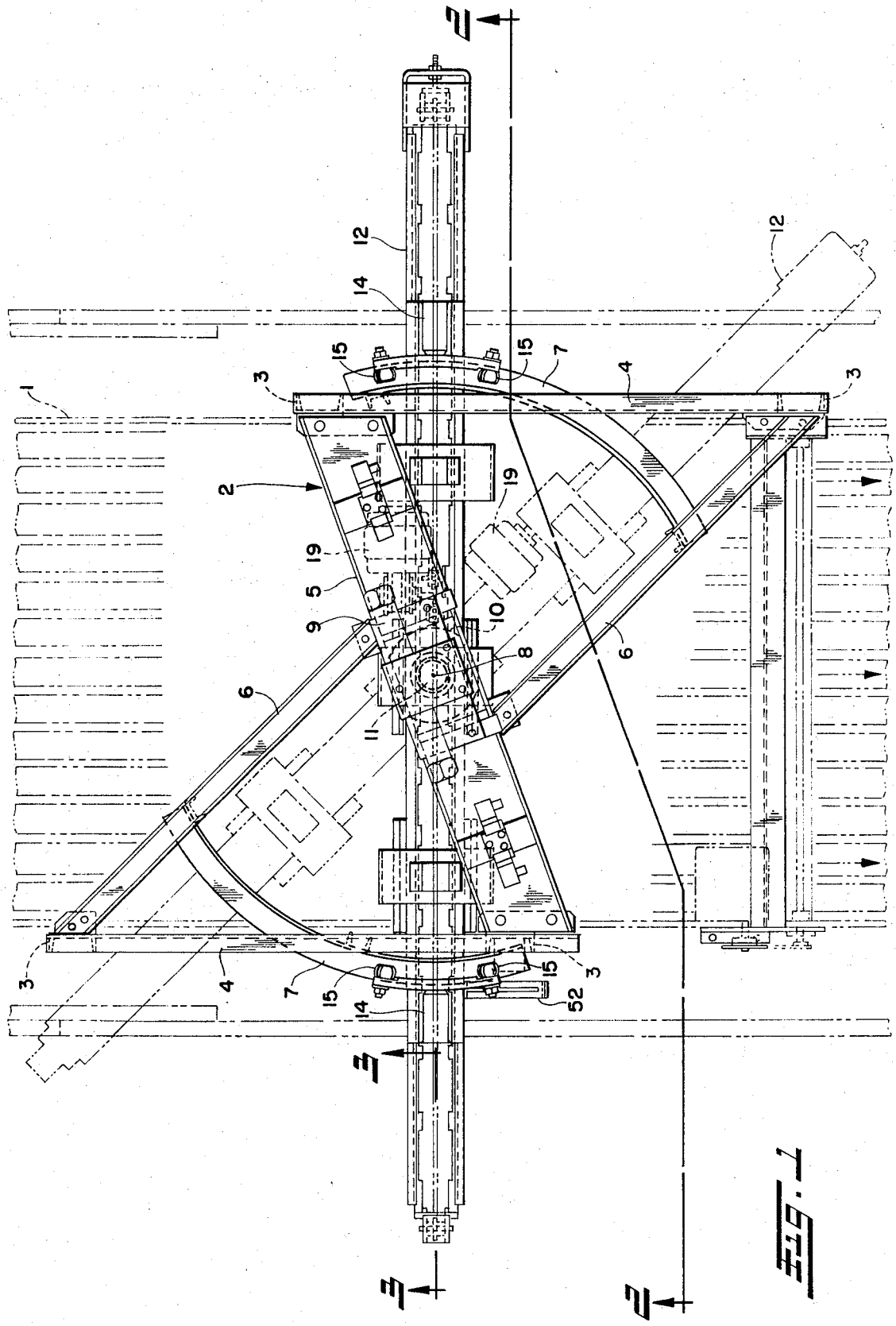

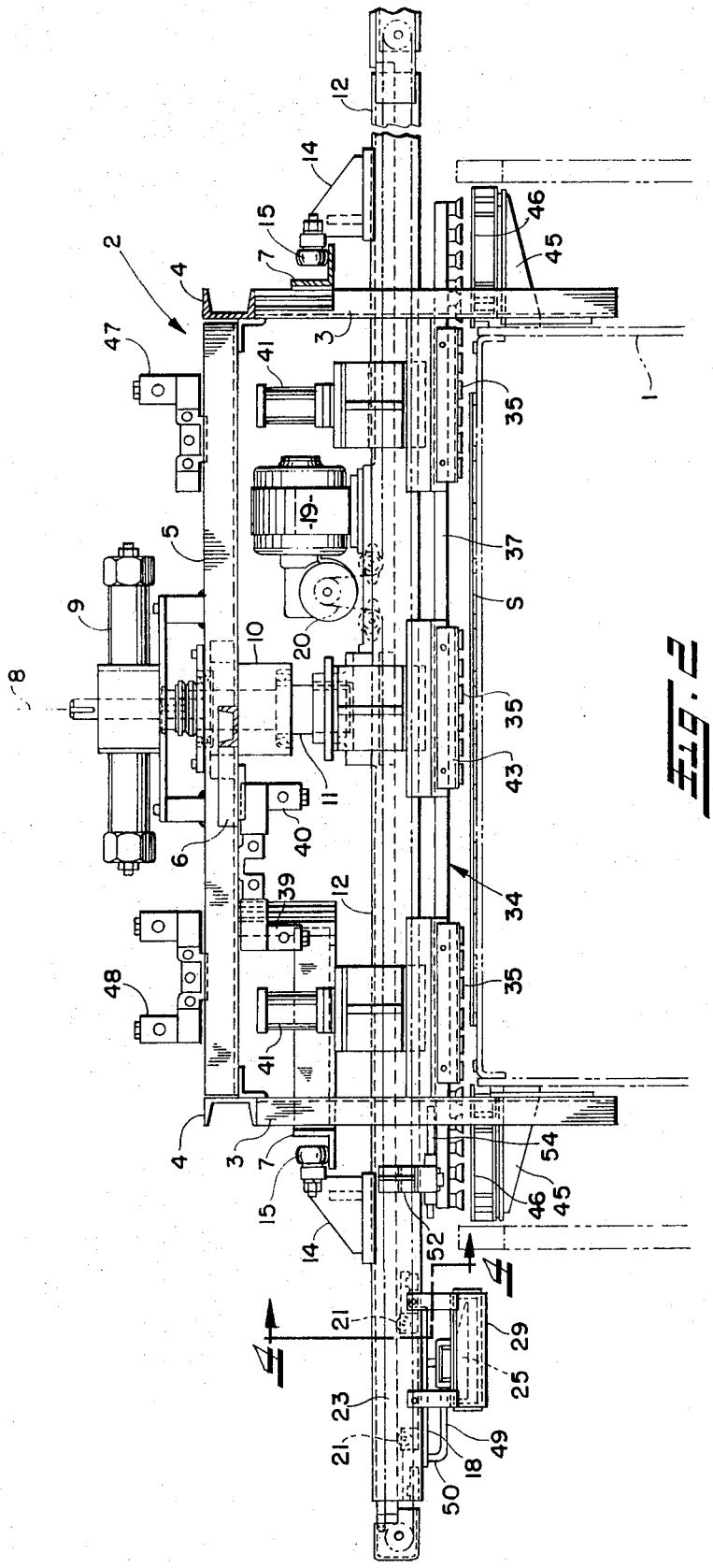

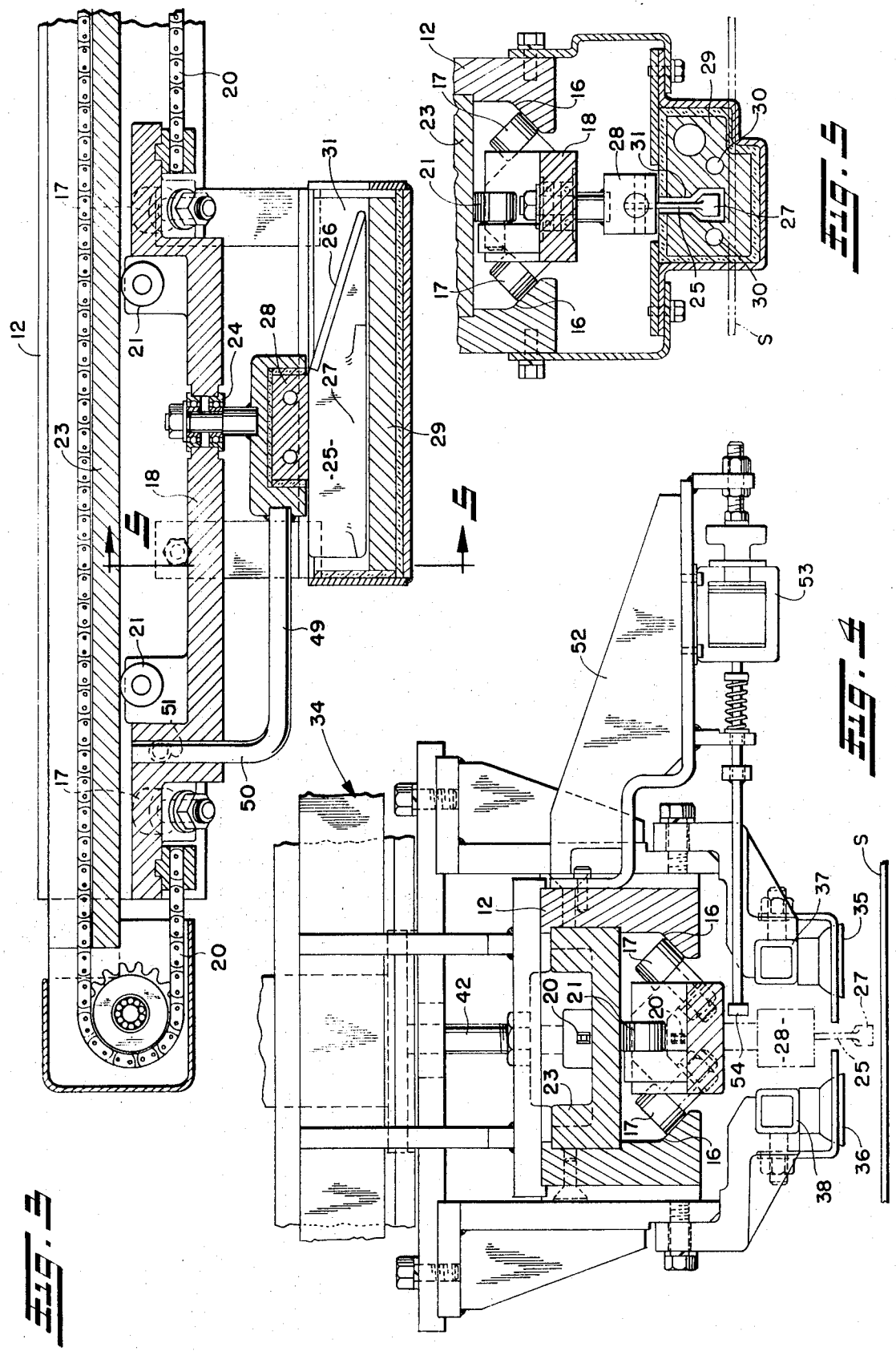

APPARATUS FOR SEVERING TIRE PLY STOCK AND THE LIKE

BACKGROUND OF THE INVENTION

In one known form of apparatus for severing tire ply stock and the like, as disclosed in the Cantarutti U.S. Pat. No. 3,429,490, dated Feb. 25, 1969, the midportion of the stock is sheared by vertical displacement of adjacent cords to form an opening into which tearing elements are inserted and then moved parallel to the cords through the opposite edges of the stock thus to tear the stock between adjacent cords. In said Cantarutti apparatus, there is provided a hold-down finger which holds the stock in place against a support while a shearing element is moved upwardly from beneath the stock support conveyor to form the aforesaid opening and then the tearing elements, which are disposed above the stock are moved transversely of the cords into the opening formed by the shearing operation followed by movement of the tearing elements parallel to the cords in opposite directions toward the edges of the stock to tear the stock between adjacent cords thereof. However, the Cantarutti apparatus is not well-suited for cordless gum ply or liner stock because such tearing operation may not progress along a straight line corresponding to the desired bias angle.

SUMMARY OF THE INVENTION

It is a principal object of this invention to provide an apparatus for severing tire ply stock and the like to predetermined length at desired bias angle which employs a heated knife blade to facilitate clean cutting of the stock along a straight line at desired bias angle whether the stock be corded ply stock or cordless gum ply or liner stock.

It is another object of this invention to provide an apparatus of the character indicated in which the knife blade has an oblique cutting edge which, during the cutting stroke, describes a plane which is above the conveyor and stock thereon and normal thereto, the stock on opposite sides of the desired bias cut line being lifted from the conveyor up against a stock support and being retained against the support by the oblique cutting edge while the knife blade makes its cutting stroke, and being released from the support at the end of the cutting stroke of the knife blade for conveying by the stock conveyor during the return stroke of the knife blade.

It is another object of this invention to provide an apparatus of the character indicated in which the knife blade, at least at the commencement of the cutting stroke, is laterally vibrated so that the cutting edge thereof will find the desired cut line between adjacent cords of the tire ply stock.

It is another object of this invention to provide an apparatus of the character indicated in which the operating mechanism is disposed above the conveyor and stock supported thereon, the apparatus having a knife blade guide means which is angularly adjustable about an axis normal to the lineal center line of the stock to enable adjustment of the guide means so that the knife blade travel will be along a path corresponding to the bias angle of the desired cut line, said guide means further having stock lifting means thereon disposed above the conveyor and stock thereon operative to lift the portion of the uncut stock into the path of travel of the cutting edge of the knife blade.

Other objects and advantages of the present invention will appear hereinafter.

BRIEF DESCRIPTION OF THE DRAWING

FIG. 1 is a top plan view of the apparatus herein, the stock conveyor being shown in phantom lines;

FIG. 2 is a cross section view taken substantially along the line 2—2. FIG. 1;

FIG. 3 is a cross-section view on enlarged scale taken substantially along the line 3—3, FIG. 1;

FIG. 4 is a cross-section view on enlarged scale taken substantially along the line 4—4, FIG. 2; and FIG. 5 is a cross-section view taken substantially along the line 5—5, FIG. 3.

DETAILED DESCRIPTION OF THE PREFERRED EMBODIMENT

The apparatus herein is illustratively shown as used in conjunction with the tire building machine servicer of the copending application of Enders et al., Ser. No. 264,158, filed June 19, 1972, which comprises a stock conveyor 1 shown in phantom lines in FIGS. 1 and 2 for advancing stock S to be cut so that its leading end is a predetermined distance from the desired cut line. In said Enders et al. application, after the stock S has been cut, the cut length is advanced by the conveyor 1 to a storage conveyor means and the adjacent stock S is drawn back toward the stock roll of a let-off unit for indexing of the latter out of register with the conveyor 1 and for indexing of the next let-off unit into register with the conveyor 1 for feeding of stock therefrom to said conveyor 1 for cutting and storage. When the storage conveyor means is loaded with the required number of pieces of cut stock S, the pieces are then fed sequentially for application around a tire building drum.

The apparatus herein comprises a frame assembly 2 including upright frame members 3 of which the lower ends are adapted to be secured to the opposite sides of the stock conveyor 1 and of which the upper ends have secured thereto longitudinal frame members 4, a main diagonally extending frame member 5, and parallel diagonal frame members 6 connected between diagonally opposite upright frame members 3 and the main frame member 5. The frame assembly 2 also includes arcuate guide rails 7 disposed in a plane parallel to the top plane of the conveyor 1 and being curved about a central axis 8 which is perpendicular to the top plane of the conveyor 1 at the longitudinal center line of the conveyor 1 and of the stock S thereon.

The main frame member 5 has at the middle thereof a double piston pneumatic actuator 9 and a bearing housing 10 whose axis coincides with the axis 8 aforesaid. Journalled in the bearing housing 10 is the upright shaft portion 11 of the knife guide rail 12, the upper end of said shaft portion 11 being fashioned as a pinion gear meshing with a gear rack of the double piston in the actuator 9. Hence, by actuating the actuator 9, the knife guide rail 12 may be adjusted to any desired angle between the solid line and phantom line positions shown in FIG. 1, so that the desired cut line of the stock S will be equal to the bias angle of the cords of the stock S. The guide rail 12 has brackets 14 thereon equipped with guide rolls 15 to engage the respective arcuate guide rails 7 thus to assist shaft portion 11 in supporting the guide rail 12 for maintaining it parallel to the top of the stock conveyor 1, in all angularly adjusted positions about the axis 8 of the central upstanding shaft portion 11 which is journalled in the bearing housing 10 of the main frame member 5. The knife guide rail 12 has parallel longitudinal guideways 16 engaged by the guide rolls 17 of the knife carriage 18, reciprocation of the carriage 18 from one end of the guide rail 12 to the other and back being effected by a reversible drive motor 19 on the guide rail 12 which drives a chain 20 having its opposite ends connected to the knife carriage 18 as best shown in FIG. 3. The carriage 18 is also guided by guide rolls 21 engaged beneath the longitudinal bar 23 of the guide rail 12.

Mounted in depending relation from the knife carriage 18 for vibration about the vertical axis of the bearings 24 is the knife blade 25 having a cutting edge 26 and having thick metal sections 27 and 28 to constitute heat sinks to maintain the knife edge 26 in heated condition as the knife carriage 28 and knife blade 25 are actuated from left to right as viewed in FIGS. 1 and 2. The knife blade 25 is heated as by heating means 29 carried by the guide rail 12 and by way of example, said heating means 29 may comprise a metal block having electric heating elements 30 therein, thus to heat the knife blade 25 when it is in its retracted position within the slot 31, as shown in FIGS. 2, 3 and 5. The bottom of the knife blade 25 is spaced above the top of the conveyor 1, a distance exceeding the thickness of the stock S and hence, when it is desired to perform the cutting operation on the stock S, the latter is lifted from the conveyor 1 in a manner now to be described.

Vertically reciprocably mounted on the guide rail 12 is a lifting assembly 34 comprising, for example, two rows of vacuum cups 35 and 36 which communicate with the respective longitudinally extending vacuum tubes 37 and 38 which are controlled by vacuum valves 39 and 40 mounted on the underside of the main frame member 5. Vertical reciprocation is effected by the cylinders 41 of the lifting assembly 34, the guide rail 12 having piston rods 42 affixed thereto, whereby air pressure acting on the tops of the pistons raises the lifting assembly 34 and air pressure beneath the pistons urges the assembly 34 downwardly so that the two rows of vacuum cups 35 and 36 engage the tire ply stock S on opposite sides of the desired cut line, and when there is vacuum in the respective tubes 37 and 38, the upward movement of the lifting assembly 34 will lift the vacuum cups 35 and 36 and the ply stock S on opposite sides of the desired cut line. The lifted stock S is backed up by the stock supports 43 against which the stock S is retained during the cutting stroke of the knife blade 25 by the upward force component of the oblique cutting edge 26.

Mounted on opposite sides of the conveyor 1 apparatus are brackets 45 which vertically reciprocably carry dummy plates 46 which are engaged by the vacuum cups 35 and 36 which are not used when the apparatus is in the solid line position of FIG. 1. Of course, when the guide rail 12 is adjusted to make a cut at, say the 45° bias line as shown in phantom lines in FIG. 1, several of the vacuum cups 35 and 36 at the ends will be in position to engaged and lift the stock S for the cutting operation.

The main frame member 5 also has thereon valves 47 and 48 to control the lift cylinders 41 and the double piston actuator 9 for the angular adjustment of the guide rail 12 to match the bias angle of the cords of the stock S which is to be cut.

The knife 25 has a rearwardly extending rod 49 thereon which terminates in an upstanding portion 50 which loosely fits in an opening in the carriage 18 and springs 51 on opposite sides of the upstanding portion 50 maintain the knife 25 in a vertical plane coinciding with the line of reciprocatory movement of the knife 25. Between the heating means 29 and the side of the conveyor 1, the guide rail 2 has a bracket 52 thereon which carries a vibrator 53 which has a frequency of say 10 pulses per second, and which has a longitudinally extending bar 54 which engages the vertical portion 50 of the rod 49 on the knife blade 25 as the latter is being moved from the heating means 29 toward the conveyor 1 to effect a cutting action, thus to impart to the knife blade 25 a vibration about the vertical axis of the bearings 24 so that the knife edge 26 oscillates back and forth. In the case of cutting stock S having parallel cords, the vibration assists in the finding of the uncured material between the parallel cords. Furthermore, because the knife blade 25 is heated, it will, as it travels from left to right, cleanly cut the stock. It has been found that the heated knife greatly facilitates the cutting operation in much the same manner that a hot knife will easily cut butter. As known, when the stock S is provided with parallel cords, the cords may be of rayon, polyester, metallic wire, etc. with the cords being held together by uncured rubber-like material. When the knife blade 25 reaches the right hand end of its movement as viewed in FIGS. 1 and 2, the stock S will have been cleanly cut between adjacent cords and if desired, the knife blade 25 when it reaches the end of its cutting stroke, will reverse the drive motor 19, initiate operation of the conveyor 1, and operate the valve to conduct air under pressure to the vacuum cups 35 to blow the stock S down onto the conveyor 1 for movement away from the end of the stock S held by vacuum cups 36. A very short time later, air under pressure may be introduced into the other row of vacuum cups 36 to release the remaining lifted end of the stock S, which, in the case of the tire building machine servicer disclosed in the Enders et al application Ser. No. 264,158, may be rewound onto the let-off unit from which it was supplied followed by indexing movement of the next let-off unit to supply a new piece of stock S for cutting. By thus sequentially releasing the cut ends of the stock S, there is no possibility of rewelding of the ends together as there might be if the lifted ends of the cut stock S were stimultaneously released from the rows of vacuum cups 35 and 36.

When the carriage drive motor 19 is thus reversed, the knife 25 is returned to the left and during that time the new piece of stock S may be conveyed to cutting position. When the knife 25 is at the end of its return stroke, it will be disposed in the heating means 29 for reheating preparatory to performing the next cutting operation after the lifting means 34 has been moved downwardly and upwardly to lift the stock S to cutting position whereat the stock S will be cut upon movement of the knife 25 toward the right as viewed in FIGS. 1 and 2.

By way of illustrative example in the cutting of tire ply stock having uncured rubber between the cords thereof, the knife blade should be heated to a temperature of from 300° to 600°F. and the amplitude of vibration of the cutting edge may be from one thirty-second to one-sixteenth inch corresponding to about one-half the distance between the cords. The frequency of the vibration may be approximately 10 cycles per second. In such example, the angle of the cutting edge 26 was about 30° from horizontal with a sharp cutting edge 26 of 45° included angle and the blade thickness was about three thirty-seconds inch. The stock cutting speed may be about three feet per second.

With reference to the lifting assembly 34, the rows of vacuum cups 35 and 36 may be replaced by magnets as in the case of tire ply stock S having steel cords.

I, therefore, particularly point out and distinctly claim as my invention:

1. Apparatus for cutting tire ply stock and the like at a desired bias angle while the stock is supported on the top of a conveyor, said apparatus comprising a guide rail above the conveyor extending longitudinally in a direction parallel to such bias angle; a knife guided by said guide rail for reciprocation along a path above and parallel to such bias angle; reversible drive means on said guide rail operatively engaged with said knife to move it in opposite directions along said guide rail; lifting means on said guide rail movable downwardly to engage a portion of the length of the stock on opposite sides of the desired line of cutting thereof and upwardly to lift the stock into the path of movement of said knife whereby the stock is cut along such line upon movement of said knife in one direction along said guide rail.

2. The apparatus of claim 1 wherein heating means adjacent one end of said guide rail is operative to heat said knife to facilitate the stock cutting operation.

3. The apparatus of claim 1 wherein heating means adjacent one end of said guide rail is operative to heat said knife while stock is positioned by said conveyor for cutting to predetermined length, the heated knife being effective to facilitate the stock cutting operation; said knife having a laterally thickened portion constituting a heat sink to retain the cutting edge of the knife in heated condition during its cutting stroke.

4. The apparatus of claim 1 wherein vibrating means on said guide rail imparts lateral vibration to said knife as it initially engages an edge of the stock thus to aid in the finding of the desired cut line between adjacent cords of cord ply stock.

5. The apparatus of claim 1 wherein heating means adjacent one end of said guide rail is operative to heat said knife to facilitate the stock cutting operation; and wherein vibrating means on said guide rail adjacent to said heating means is operative to vibrate the heated knife laterally as it moves into initial engagement with an edge of the stock thus to facilitate the finding of the desired cut line between adjacent cords of cord ply stock.

6. The apparatus of claim 1 wherein said lifting means comprises two rows of vacuum cups which engage and lift the stock responsive to downward and upward movement of said lifting means; and means for releasing the vacuum in said cups thus to release the cut stock on opposite sides of the line of cutting for movement onto the conveyor whereby operation of the latter may be initiated during the return stroke of said knife.

7. The apparatus of claim 1 wherein a fixed frame member is disposed above said guide rail; and wherein said guide rail is pivotally suspended from said frame member for angular adjustment of said guide rail so that the path of movement of said knife corresponds to the desired bias angle of the stock.

8. The apparatus of claim 2 wherein said heating means has a longitudinal slot to receive and embrace said knife at the end of its return stroke.

* * * * *